US012573571B2

(12) United States Patent
Kotraiah et al.

(10) Patent No.: US 12,573,571 B2
(45) Date of Patent: Mar. 10, 2026

(54) RELAY BASE

(71) Applicant: Hitachi Energy Ltd, Zurich (CH)

(72) Inventors: Gurusiddaiah Kotraiah, Bengaluru Rural (IN); Manjunath Aj, Girinagar (IN)

(73) Assignee: HITACHI ENERGY LTD, Zurich (CH)

( * ) Notice: Subject to any disclaimer, the term of this patent is extended or adjusted under 35 U.S.C. 154(b) by 525 days.

(21) Appl. No.: 18/133,802

(22) Filed: Apr. 12, 2023

(65) Prior Publication Data

US 2023/0335361 A1 Oct. 19, 2023

(30) Foreign Application Priority Data

Apr. 13, 2022 (IN) ............................ 202241022030
May 31, 2022 (EP) .................................... 22176291

(51) Int. Cl.

| | |
|---|---|
| ***H01H 50/04*** | (2006.01) |
| ***H01H 45/02*** | (2006.01) |
| ***H01H 50/14*** | (2006.01) |
| ***H01H 50/54*** | (2006.01) |
| ***H01R 13/405*** | (2006.01) |

(52) U.S. Cl.
CPC .......... *H01H 50/048* (2013.01); *H01H 50/14* (2013.01); *H01H 50/54* (2013.01); *H01R 13/405* (2013.01); *H01H 45/02* (2013.01); *H01H 2050/049* (2013.01)

(58) Field of Classification Search
CPC ...... H01H 50/048; H01H 50/14; H01H 50/54; H01H 45/02; H01H 2050/049; H01H 45/14; H01H 50/021; H01R 13/405; H01R 9/2491; H01R 11/26
See application file for complete search history.

(56) References Cited

U.S. PATENT DOCUMENTS 11,108,202 B2 * 8/2021 Houry .................. H01H 50/048
11,539,177 B2 * 12/2022 Dingman ............... H05K 7/103
2017/0323748 A1 * 11/2017 Gutmann ............... H01H 50/16
2020/0279708 A1 * 9/2020 Ito .......................... H01H 50/56

FOREIGN PATENT DOCUMENTS

| | | | |
|---|---|---|---|
| CN | 205984814 | U | 2/2017 |
| CN | 211929737 | U | 11/2020 |
| DE | 4443349 | A1 | 6/1996 |
| EP | 2889889 | A1 | 7/2015 |
| FR | 2972291 | A1 | 9/2012 |
| WO | 2010/141060 | A1 | 12/2010 |

* cited by examiner

*Primary Examiner* — Briggitte R. Hammond
(74) *Attorney, Agent, or Firm* — PROCOPIO, CORY, HARGREAVES & SAVITCH LLP

(57) ABSTRACT

A relay base for connection to a plug-in relay is disclosed. The relay base comprises a plurality of connection units. Each connection unit comprises an electrically conductive socket member having a first end configured to receive a pin of the relay, an electrically conductive flexible connector having a first end that is electrically connected to a second end of the socket member, and an electrically conductive insert having a first end that is electrically connected to a second end of the flexible connector. A second end of the insert is configured as an electrical connectivity receptacle (e.g., a screw type terminal comprising a thread for receiving a screw). The configuration of the second end of the insert allows for facilitated making and breaking an electrical connection between the relay and an external wiring.

20 Claims, 10 Drawing Sheets

RELAY BASE

CROSS-REFERENCE TO RELATED APPLICATIONS

The present application claims priority to Indian Application No. 202241022030, filed on Apr. 13, 2022, and European Application No. 22176291.7, filed on May 31, 2022, which are both hereby incorporated herein by reference as if set forth in full.

BACKGROUND

The present disclosure relates to a relay base for connection to a plug-in relay. It further relates to the use of a relay base according to the present disclosure, a kit comprising a relay base and a relay, as well as a method of manufacturing a relay base.

A relay is an electrically operated switch. Examples for a relay are inter alia an auxiliary relay, a measuring relay, a protection relay and a control relay. A relay may be used for example for operating a current transformer.

A plug-in relay is a relay that is configured to be plugged into a receptacle for example in the form of a terminal base or a relay base. An example of a plug-in relay is a plug-in relay for current transformers.

A relay base—as used herein—may be a device configured to be electrically and mechanically connected to a plug-in relay and configured to provide electrical connection between the plug-in relay on the one hand, particularly the pins of a plug-in relay, and an external wiring on the other hand. A relay base is typically configured to be mounted on a support, for example in the form of a rack, a bar or a panel board.

FIG. 11 shows an example of a plug-in relay 100 which can be plugged into a relay base 102 according to prior art. The plug-in relay 100 together with the corresponding relay base 102 can be considered as constituting a relay unit. As illustrated in FIG. 11, the plug-in relay 100 has contact pins or pins 106 as terminals for electrical connection. Electrical connections between an external wiring comprising a electrical conductor 104 and the pins 106 are provided via sockets which are housed in corresponding recesses formed within the relay base 102. In order to establish the electrical connection, a socket is crimped to the conductor 104 by use of a special crimping tool and subsequently the socket is pushed from outside into a corresponding recess within the relay base 102 such that it is held in the recess in a clamped manner. Removing the conductor 104 from the relay base 102 requires handling with a special tool, usually called extractor.

Therefore, making and breaking corresponding electrical connections with such a relay unit requires inter alia special sockets, a crimping tool and an extractor. This has proven cumbersome and time consuming.

Accordingly, there is a need in the art for an improved relay base, overcoming or at least alleviating the disadvantages of the prior art. There is the further need for an improved relay kit comprising at least one relay base and at least one relay providing an improved application spectrum. There is particularly a need for a relay base and a relay kit allowing facilitated handling in making and breaking electrical connections between a relay and an external wiring.

This object is achieved by the independent claims. Dependent claims refer to preferred embodiments. Additional or alternative aspects of the present disclosure are addressed throughout this specification.

SUMMARY

According to the present disclosure a relay base for connection to a plug-in relay is provided that comprises a plurality of connection units. Each connection unit comprises an electrically conductive socket member, an electrically conductive flexible connector, and an electrically conductive insert. The electrically conductive socket member has a first end and a second end. The first end is configured to receive a pin of the relay. The electrically conductive flexible connector has a first end and a second end. The first end of the flexible connector is electrically connected to the second end of the socket member. The electrically conductive insert has a first end and a second end. The first end of the insert is electrically connected to the second end of the flexible connector. The second end of the insert is configured as an electrical connectivity receptacle, for example in the form of a screw type terminal, comprising a thread for receiving a screw.

More generally, the electrical connectivity receptacle may be an electrical connectivity receptacle with an inner thread, for example a screw type terminal. Alternatively, the electrical connectivity receptacle may be an electrical connectivity receptacle with an unthreaded connection, for example an unthreaded push in type connection. This may particularly allow for connecting external push in type connectors. In any case, the receptacle may be a male or a female receptacle.

Furthermore, receptacles, which may be threaded, can be provided which are configured such that they can be fastened onto the inserts, e. g. screwed into the inserts. Female sockets can be pushed-on or male pins can be pushed-in these receptacles for electrical connectivity.

The configuration of the second end of the insert allows for readily making and breaking an electrical connection between the relay and an external wiring by exclusively using a standard screwdriver without compromising on compactness and safety requirements. No special tool such as an extractor or a crimping tool is necessary. Moreover, standard cables having, e.g., a ring terminal or a fork terminal, in other words cables with standard round or fork cable lugs can be used as continuing cables for establishing the external wiring. Specifically, there is no need for crimping a continuing cable to a socket and subsequently pushing the socket into the relay base. In this manner, the relay base allows swift and facilitated handling for making and breaking the electrical connections. The structure according to the present disclosure also allows for a compact design of the base, having a small footprint. Also, the relay base allows for an optimized connection of one or more relays.

Thus, the relay base may be denominated as a universal relay base with flexible connection for plug-in type relays.

Various embodiments may implement the following features:

The electrical connectivity receptacle may be configured to provide an electrical connection to an external conductor or cable having a cross-section of up to 6 $mm^2$. This is advantageous because a relay base according to the above described prior art allows electrical connection exclusively to cables with a maximum cross-section of 1.5 $mm^2$.

The electrical connectivity receptacle may be configured to accommodate one or two external lugs. Thus, two continuing cables can be electrically connected to the second end of the insert.

The electrical connectivity receptacle may be configured to receive a cable having a ring terminal and/or a cable having a fork terminal. Thus, the second end of the insert can be connected to both types of cables.

The relay base may further comprise a screw, i. e. a screw suitable for being screwed into the thread of the screw type terminal and for mechanically fixing and electrically connecting to at least one end portion of an external cable, for example in form of a round or fork cable lug, to the second end of the insert.

The relay base may further comprise a lug member for connecting the second end of the flexible connector to the first end of the insert. This allows for a reliable electrical connection between the flexible connector and the insert. Moreover, this connection is easy to manufacture and apply.

The lug member may be connected, particularly directly connected to the second end of the flexible connector.

The first end of the insert may be configured as a further screw type terminal, comprising a further thread for receiving a further screw for connecting the lug member. Particularly, the first end of the insert may be electrically and mechanically connected to the lug member via the further screw type terminal.

The socket member is particularly suitable for providing a reliable electrical contact to a pin of a relay. Thus, it constitutes an efficient mate for a relay pin.

The socket member may have a first main axis and the thread of the second end of the insert may have a second main axis being parallel to the first main axis. This allows for a particularly compact design of the relay base.

The distance between the first main axis and the second main axis may be less than five times the inner diameter of the thread of the second end of the insert, preferably less than three times the inner diameter of the thread of the second end of the insert. Alternatively, the distance between the first main axis and the second main axis may be less than 8 mm, preferably less than 5 mm.

Typically, the pins of a plug-in relay are at fixed positions, i.e., the locations of the pins may be described by a fixed pattern. The flexibility of the flexible connectors allows for providing the second ends of the inserts, i.e., the screw type terminals at locations which are not congruent to the corresponding locations of the pins, in other words, the flexibility of the flexible connectors allows for providing the screw type terminals at locations which show a pattern that differs from the pattern of the locations of the pins.

The electrically conductive flexible connector may be configured to be bend in such a way that its first end is oriented parallel to the first main axis and its second end is oriented parallel to the second main axis. In this way, the distance between the first main axis and the second main axis can be electrically and mechanically bridged by the electrically conductive flexible connector. In other words, the flexible connectors may bridge the axial offset.

The insert may be a bush, for example a brass bush. The insert may have a through-hole extending between the first end and the second end of the insert, wherein the thread of the second end of the insert is formed within the through-hole.

Advantageously, the thread of the further screw type terminal may also be formed within the through-hole of the insert.

The insert may have a hollow cylindrical shape. This allows for a compact design of the relay base.

The first end of the insert may comprise a flange. The flange may be a ring-shaped flange extending radially outwardly around the second main axis. The flange may be configured for fixing the insert and/or for preventing a movement of the insert in a direction parallel to the second main axis.

The insert may comprise a knurled external surface portion. The knurled external surface portion particularly may be configured for fixing the insert against a movement in a direction around and/or parallel to the second main axis.

The first end of the flexible connector may be connected to the second end of the socket member by a crimped connection. This contributes to a high reliability of the electrical connection between the flexible connector and the socket member.

The second end of the flexible connector may be connected to the lug member by a crimped connection. This contributes to a high reliability of the electrical connection between the flexible connector and the lug member.

The lug member may be connected to the first end of the insert by a screw coupling, particularly via the above-mentioned further screw type terminal formed at the first end of the insert. The screw coupling may comprise a screw, for example the above-mentioned further screw threadingly connected to the through-hole of the insert.

The pin of the relay may be a pin having a circular cross-section. The pin may protrude from a base surface of the plug-in relay.

The relay base may further comprise a terminal plate for supporting the insert.

The insert may be fixed to the terminal plate, for example by insert-molding the terminal plate around the insert.

The terminal plate may extend predominantly in a plane perpendicular to the first main axis. The terminal plate may made from a plastic material.

The flange of the insert may be configured to prevent a movement of the insert relative to the terminal plate parallel to the second main axis, directing away from the socket member. In this way, a reliable fixation of the insert at the terminal plate against a pulling movement directed away from the socket member can be achieved.

The relay base may further comprise a middle plate for supporting the socket member.

The middle plate may be configured to prevent a movement of the socket member parallel to the first main axis, directing towards the insert. The socket member may comprise a holding portion, e. g. a radially protruding flange configured to mechanically interact with the middle plate for preventing the movement of the socket member parallel to the first main axis.

In this way, it is possible in particular to prevent the socket member from being displaced away from the pin during establishing an electrical connection between the relay base and the relay by plugging the relay into the relay base.

The middle plate may extend predominantly in a plane perpendicular to the first main axis. The middle plate may made from a plastic material.

The middle plate may have a through hole configured to support the socket member. Preferably, the middle plate has a plurality of through holes corresponding to the socket members of the plurality of connection units.

The relay base may further comprise a top plate configured to prevent a movement of the socket member parallel to the first main axis, directing to the side of the pin. In this way, it is possible in particular to prevent the socket member from being displaced away from the insert during releasing the connection between the relay and the relay base.

The top plate may made from a plastic material. The top plate may be fixed to the middle plate, for example by an ultrasonic welding connection.

The middle plate and the top plate may be configured to allow a rotation of the socket member about the first main axis. This facilitates handling during assembling the relay base.

The terminal plate may be connected to the middle plate by a screw coupling. The terminal plate, the middle plate and the top plate may be oriented parallel to each other.

The terminal plate, the middle plate and the top plate may be attached to each other to form a housing for the plurality of connection units.

The plurality of connection units may comprise between fifty-four and seventy-four, preferably between sixty and sixty-eight connection units.

It is noted that the number of the pins of the plug-in relay may be less than the number of the connection units.

The relay base may have a first dimension which is between 73 mm and 93 mm and a second dimension which is between 152 mm and 172 mm and/or a third dimension which is between 40 mm and 65 mm, preferably between 50 mm and 60 mm, more preferably between 53 and 55 mm.

The relay base may further comprise means for mechanically connecting the relay base to the relay. The means for mechanically connecting the relay base to the relay may be integrally connected to the top plate.

The means for mechanically connecting the relay base to the relay may comprise at least one flange protruding from the remainder of the relay base in a direction perpendicular to the first main axis. The means for mechanically connecting the relay base to the relay may comprise at least two flanges protruding from the remainder of the relay base in two directions perpendicular to the first main axis, preferably in two opposite directions.

The relay base may further comprise means for mounting the relay base to a frame or support, for example to a frame or rack. The means for mounting the relay base may be integrally connected to the top plate.

The means for mounting the relay base may comprise at least one flange protruding from the remainder of the relay base in a direction perpendicular to the first main axis. The means for mounting the relay base to the relay may comprise at least two flanges protruding from the remainder of the relay base in two directions perpendicular to the first main axis, preferably in two opposite directions.

Generally, the screw type terminals formed by the second ends of the inserts could also be designed differently, for example as push-on type sockets.

According to a further aspect of the present disclosure a relay kit or simply a kit is provided that comprises at least one relay base as described herein and at least one plug-in relay, wherein the plug-in relay is configured to be connected to the at least one relay base.

The at least one plug-in relay may comprise a relay configured as a plug-in relay for current transformers.

The at least one plug-in relay may comprise several relays, for example two relays and/or four relays which are configured to be simultaneously electrically and mechanically connected to one relay base of the at least one relay base. This allows for a modular design on relay mounting.

According to a further aspect of the present disclosure a use of a relay base as described herein for connecting to a plug-in relay is provided.

According to a further aspect of the present disclosure a method of manufacturing a relay base is provided. The method comprises the following step (i):

providing a connection unit which comprises an electrically conductive socket member having a first end and a second end, the first end being configured to receive a pin of the relay, an electrically conductive flexible connector having a first end and a second end, and an electrically conductive insert having a first end and a second end, wherein the second end of the insert is configured as a screw type terminal, comprising a thread for receiving a screw, wherein the step comprises electrically connecting the first end of the flexible connector to the second end of the socket member.

The method may further comprise the following step (ii): providing a terminal plate and fixing the insert to the terminal plate, preferably by insert-molding the terminal plate around the insert.

The method may further comprise the following step (iii): electrically connecting the first end of the insert to the second end of the flexible connector, for example by connecting the lug member to the first end of the insert.

The method may further comprise the following step (iv): providing a middle plate for supporting the socket member and mounting the socket member on the middle plate.

The method may further comprise the following step (v): connecting the middle plate and the terminal plate, preferably by a screw fastening.

In particular, the present disclosure comprises the following aspects:

1. A relay base for connection to a plug-in relay, comprising
   - a plurality of connection unit, each connection unit comprising an electrically conductive socket member having a first end and a second end, the first end being configured to receive a pin of the relay,
   - an electrically conductive flexible connector having a first end and a second end, the first end of the flexible connector being electrically connected to the second end of the socket member, and
   - an electrically conductive insert having a first end and a second end, the first end of the insert being electrically connected to the second end of the flexible connector,
   - wherein the second end of the insert is configured as an electrical connectivity receptacle, for example a screw type terminal, comprising a thread for receiving a screw.
2. The relay base of aspect 1, wherein the screw type terminal is configured to provide an electrical connection to a cable having a cross-section of up to 6 $mm^2$.
3. The relay base of aspect 1 or 2, wherein the screw type terminal is configured to accommodate one or two external lugs.
4. The relay base of any of the preceding aspects, wherein the screw type terminal is configured to receive a cable having a ring terminal and/or a cable having a fork terminal.
5. The relay base of any of the preceding aspects, further comprising the screw.
6. The relay base of any of the preceding aspects, further comprising
   - a lug member for connecting the second end of the flexible connector to the first end of the insert.
7. The relay base of aspect 6, wherein the lug member is connected to the second end of the flexible connector.
8. The relay base of aspect 6 or 7, wherein the first end of the insert is configured as a further screw type terminal, comprising a thread for receiving a further screw for connecting the lug member.
9. The relay base of any of the preceding aspects, wherein the socket member has a first main axis and the thread of the second end of the insert has a second main axis being parallel to the first main axis.

10. The relay base of aspect 9, wherein the distance between the first main axis and the second main axis is less than five times the inner diameter of the thread of the second end of the insert, preferably less than three times the inner diameter of the thread of the second end of the insert, or wherein the distance between the first main axis and the second main axis is less than 8 mm, preferably less than 5 mm.

11. The relay base of any of the preceding aspects, wherein the insert has a through-hole extending between the first end and the second end of the insert, wherein the thread of the second end of the insert is formed within the through-hole.

12. The relay base of any of the preceding aspects, wherein the insert has a hollow cylindrical shape.

13. The relay base of any of the preceding aspects, wherein the first end of the insert comprises a flange.

14. The relay base of aspect 13, comprising the features of aspect 9, wherein the flange is configured for fixing the insert and/or for preventing a movement of the insert in a direction parallel to the second main axis.

15. The relay base of any of the preceding aspects, wherein the insert comprises a knurled external surface portion.

16. The relay base of aspect 15, wherein the knurled external surface portion is particularly configured for fixing the insert against a movement in a direction around and/or parallel to the second main axis.

17 The relay base of any of the preceding aspects, wherein the first end of the flexible connector is connected to the second end of the socket member by a crimped connection.

18. The relay base of any of the preceding aspects, comprising the features of aspect 6, wherein the second end of the flexible connector is connected to the lug member by a crimped connection.

19 The relay base of any of the preceding aspects, comprising the features of aspect 6, wherein the lug member is connected to the first end of the insert by a screw coupling.

20. The relay base of aspect 19, wherein the screw coupling comprising a further screw threadingly connected to the through-hole of the insert.

21. The relay base of any of the preceding aspects, wherein the pin of the relay is a pin having a circular cross-section.

22. The relay base of any of the preceding aspects, further comprising a terminal plate for supporting the insert.

23. The relay base of aspect 22, wherein the insert is fixed to the terminal plate, for example by insert-molding the terminal plate around the insert.

24. The relay base of aspect 22 or 23, comprising the features of aspect 9, wherein the terminal plate extends predominantly in a plane perpendicular to the first main axis.

25. The relay base of any of aspect 24, comprising the features of aspect 13, wherein the flange is configured to prevent a movement of the insert relative to the terminal plate parallel to the second main axis, directing away from the socket member.

26. The relay base of any of the preceding aspects, further comprising a middle plate for supporting the socket member.

27. The relay base of aspect 26, comprising the features of aspect 9, wherein the middle plate is configured to prevent a movement of the socket member parallel to the first main axis, directing towards the insert.

28. The relay base of aspect 26 or 27, comprising the features of aspect 9, wherein the middle plate extends predominantly in a plane perpendicular to the first main axis.

29. The relay base of any of the preceding aspects, comprising the features of aspect 9, further comprising a top plate configured to prevent a movement of the socket member parallel to the first main axis, directing to the side of the pin.

30 The rely base of aspect 29, comprising the features of aspect 26, wherein the top plate is fixed to the middle plate, for example by an ultrasonic welding connection.

31. The relay base of any of the preceding aspects, comprising the features of aspects 26 and 29, wherein the middle plate and the top plate are configured to allow a rotation of the socket member about the first main axis.

32. The relay base of any of the preceding aspects, comprising the features of aspects 22 and 26, wherein the terminal plate is connected to the middle plate by a screw coupling.

33. The relay base of any of the preceding aspects, comprising the features of aspects 22, 26 and 29, wherein the terminal plate, the middle plate and the top plate are oriented parallel to each other.

34. The relay base of any of the preceding aspects, comprising the features of aspects 22, 26 and 29, wherein the terminal plate, the middle plate and the top plate are attached to each other to form a housing for the plurality of connection units.

35. The relay base of any of the preceding aspects, wherein the plurality of connection units comprises between fifty-four and seventy-four, preferably between sixty and sixty-eight connection units.

36. The relay base of any of the preceding aspects, wherein the relay base has a first dimension which is between 73 mm and 93 mm and a second dimension which is between 152 mm and 172 mm and/or a third dimension which is between 40 mm and 65 mm, preferably between 50 mm and 60 mm, more preferably between 53 and 55 mm.

37. A kit, comprising at least one relay base according to any of the preceding aspects, and at least one plug-in relay configured to be connected to the at least one relay base.

38. The kit of aspect 38, wherein the at least one plug-in relay comprises a relay configured as a plug-in relay for current transformers.

39. The kit according to aspect 37 or 38, wherein the at least one plug-in relay comprises two relays and/or four relays which are configured to be electrically and mechanically connected to one relay base of the at least one relay base.

40. Use of a relay base according to any of aspects 1 to 36 for connecting to a plug-in relay.

41. Method of manufacturing a relay base, comprising the following step (i):

providing a connection unit which comprises an electrically conductive socket member having a first end and a second end, the first end being configured to receive a pin of the relay, an electrically conductive flexible connector having a first end and a second end, and an electrically conductive insert having a first end and a second end, wherein the second end of the insert is configured as a screw type terminal, comprising a thread for receiving a screw, wherein the step comprises electrically connecting the first end of the flexible connector to the second end of the socket member.

42. The method of aspect 41, further comprising the following step (ii): providing a terminal plate and fixing the insert to the terminal plate, preferably by insert-molding the terminal plate around the insert.

43. The method of aspect 41 or 42, further comprising the following step (iii): electrically connecting the first end of the insert to the second end of the flexible connector.

44. The method of aspect 42 or 43, further comprising the following step (iv): providing a middle plate for supporting the socket member and mounting the socket member on the middle plate.

45. The method of aspect 44, further comprising the following step (v): connecting the middle plate and the terminal plate, preferably by a screw fastening.

SHORT DESCRIPTION OF THE DRAWINGS

The subject-matter of the disclosure will be explained in more detail with reference to preferred exemplary embodiments which are illustrated in the attached drawings, in which.

Figure 9C:
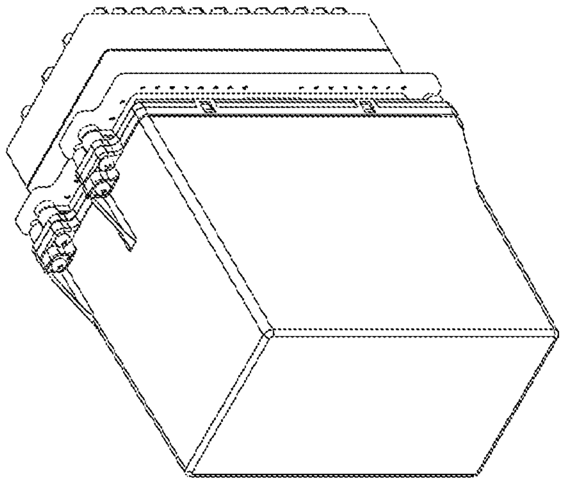
Figure 9B:
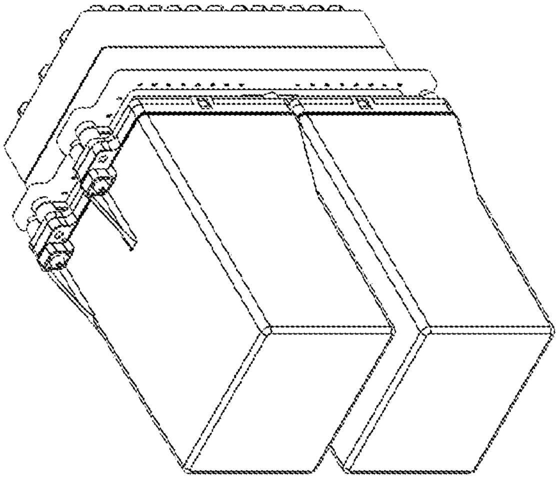
Figure 9A:
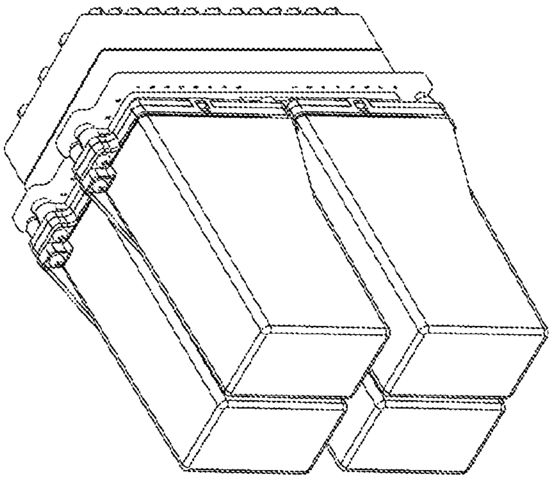

FIG. 9*a* is a perspective view of four relays connected to a relay base.

FIG. 9*b* is a perspective view of two relays connected to a relay base.

FIG. 9*c* is a perspective view of one relay connected to a relay base.

Figure 10:
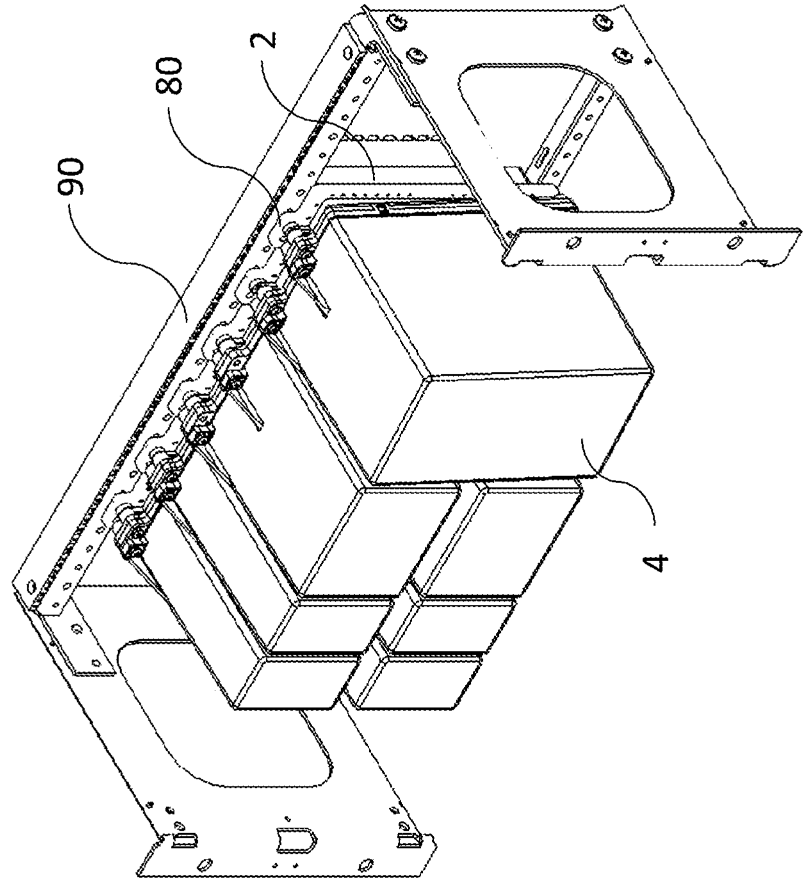

FIG. 10 is a perspective view of a relay connected to a relay base, wherein the relay base is connected to a rack.

Figure 11:
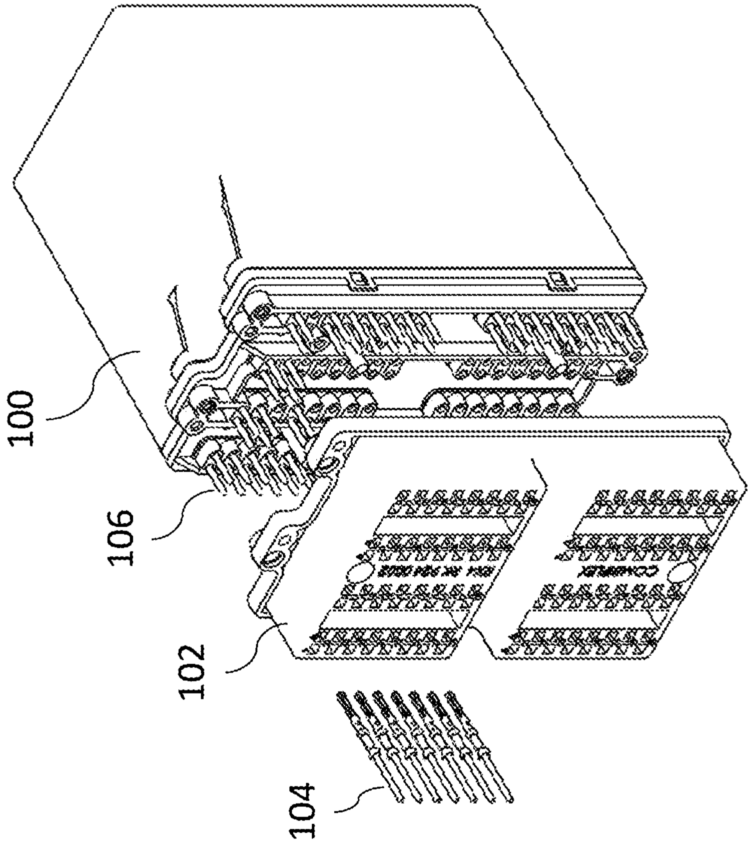
Fig. 11 prior art

FIG. 11 illustrates a relay, a relay base and a continuing conductor according to prior art.

DETAILED DESCRIPTION

Figure 1:
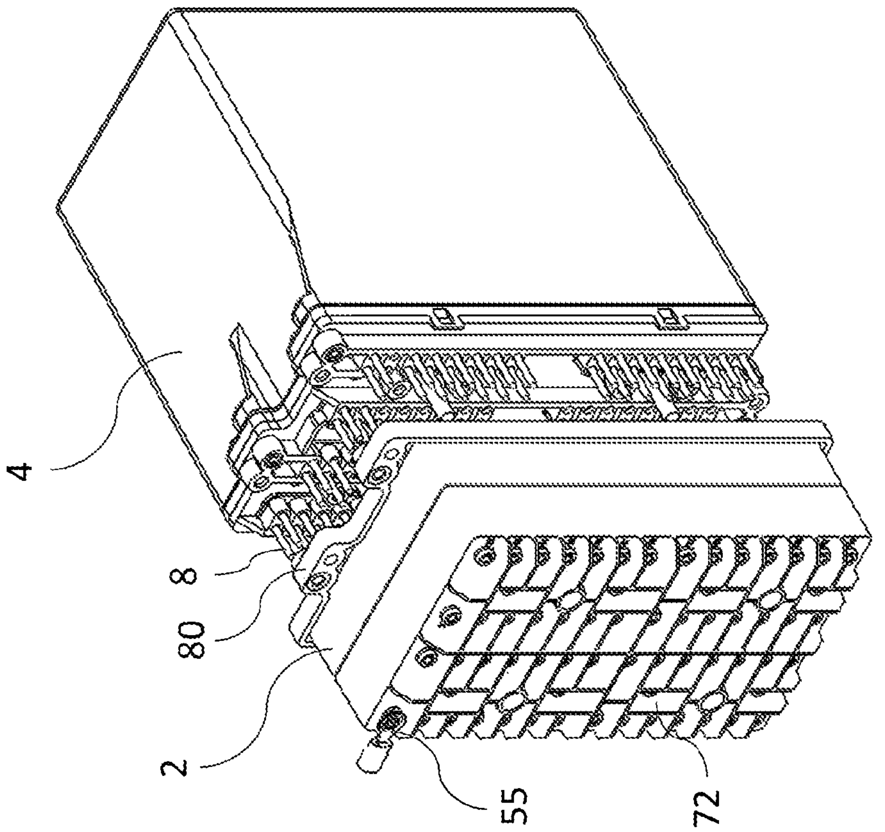
FIG. 1 is a perspective view of a relay base and a plug-in relay.

FIG. 1 is a perspective view of a relay base 2 and a plug-in relay 4. The relay base 2 is configured for connecting to the plug-in relay 4. The plug-in relay 4 may be for example a current transformer relay. The plug-in relay 4 has a plurality of pins 8 or connecting pins 8. The pins 8 are electrically connecting and for example configured as operating contact terminals of the relay 4. Here, the pins 8 have a circular cross-section.

Figure 5:
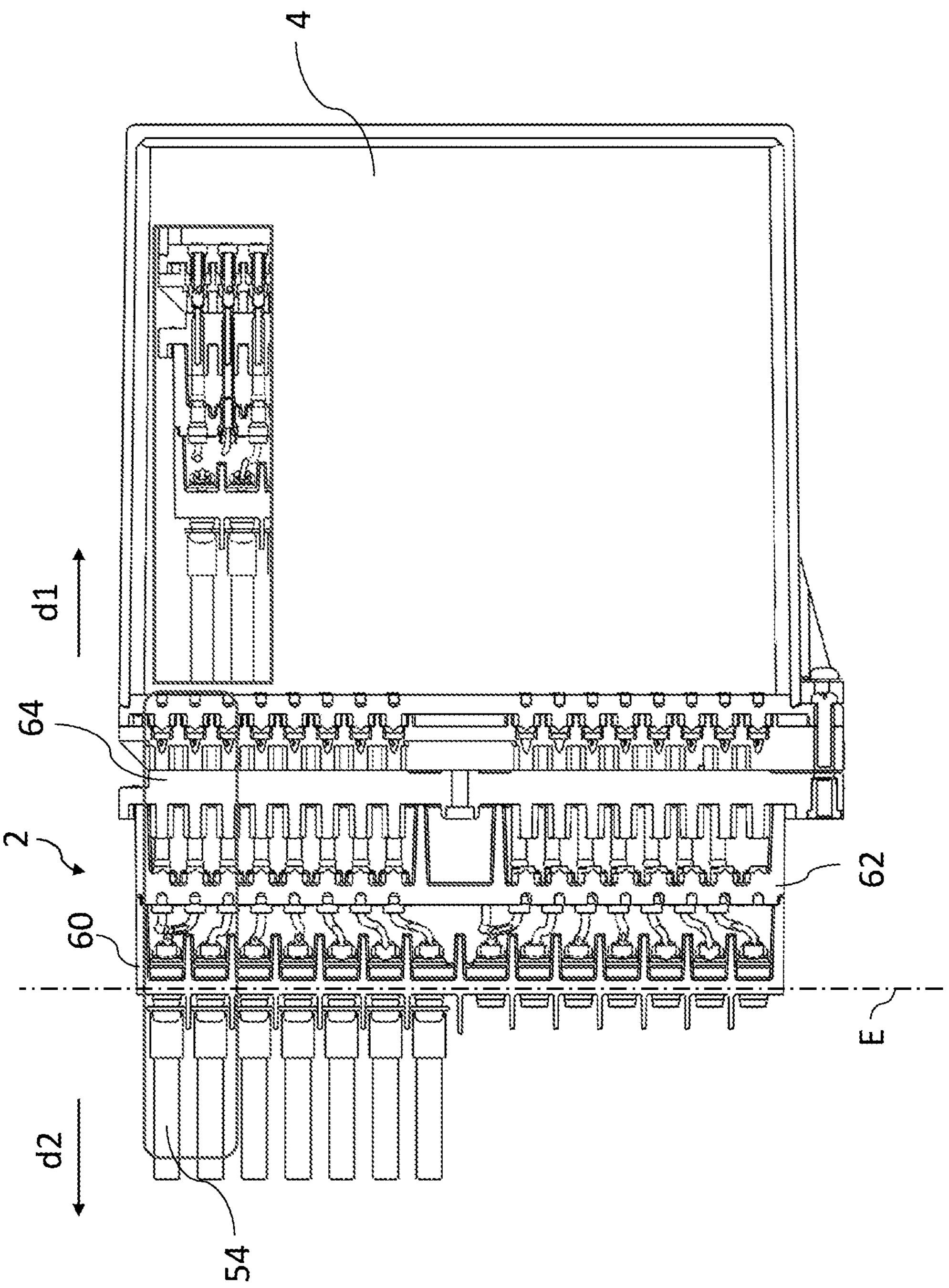
FIG. 5 is a cross-section of the relay base and the plug-in relay.
Figure 6:
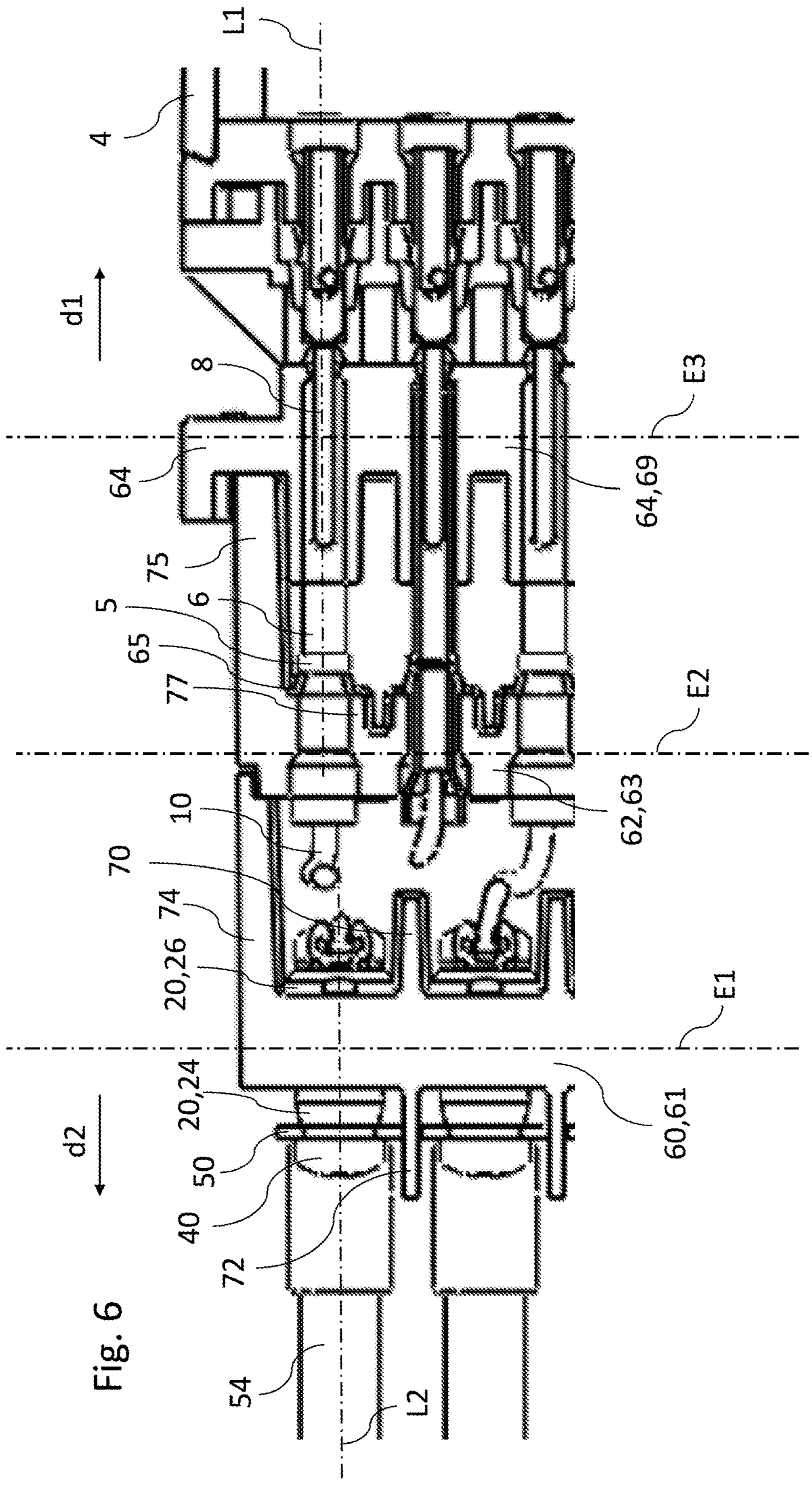
FIG. 6 is a detail of FIG. 5.

The relay base 2 comprises a plurality of connection units. One such connection unit 3 is exemplarily illustrated in FIG. 2. The connection unit 3 comprises an electrically conductive socket member 6, an electrically conductive flexible connector 10, and an electrically conductive insert 20. FIG. 5 is a cross-section of the relay base 2 and the plug-in relay 4, and FIG. 6 shows a detail of FIG. 5, illustrating the connection unit 3 within the remainder of the relay base 2.

The socket member 6 has a first end 7 and a second end 9. The first end 7 is configured to receive one of the pins 8 of the plug-in relay 4. The first end 7 is preferably configured to receive exclusively one of the pins 8.

Figure 2:
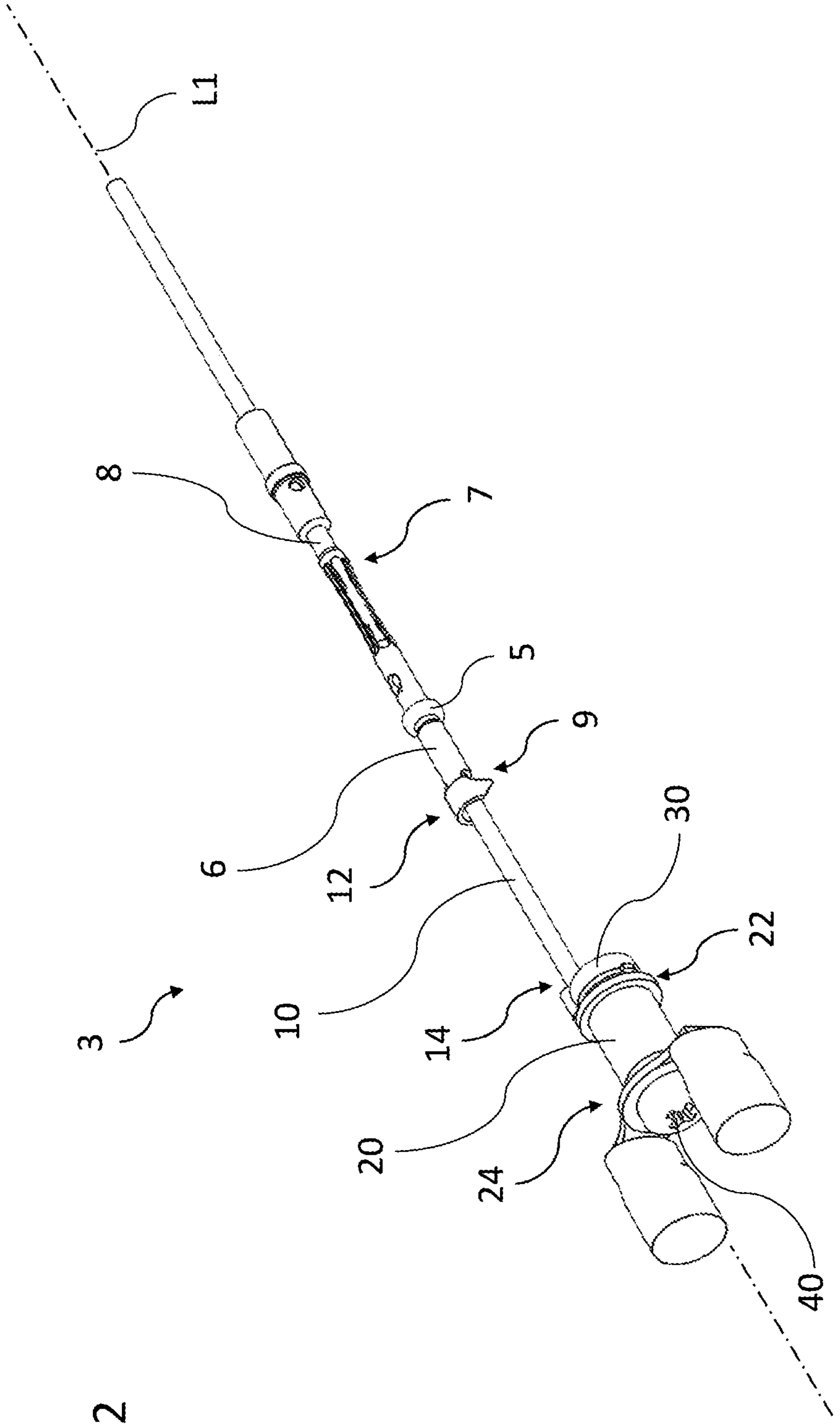
FIG. 2 is a perspective view of a connection unit of the relay base.

The socket member 6 may be elongated having a first main axis L1, as indicated e. g. in FIG. 2. The second end 9 of the socket member 6 is opposite the first end 7. The configuration may be such that an electrical connection between the plug-in relay 4 and the relay base 2, particularly between the pin 8 and the socket member 6, can be established via a movement of the plug-in relay 4 relative to the relay base 2 in a direction, indicated in FIG. 5 as a second direction d2 parallel to the first main axis L1. Separating the plug-in relay 4 from the relay base 2 may be established via a further movement of the plug-in relay 4 along a further direction, indicated in FIG. 5 as a first direction d1 opposite to the second direction d2.

The electrically conductive flexible connector 10 has a first end 12 and a second end 14. The first end 12 is electrically connected to the second end 9 of the socket member 6, preferably by a crimped connection. The flexible connector 10 may be a flexible cable.

Figure 3:
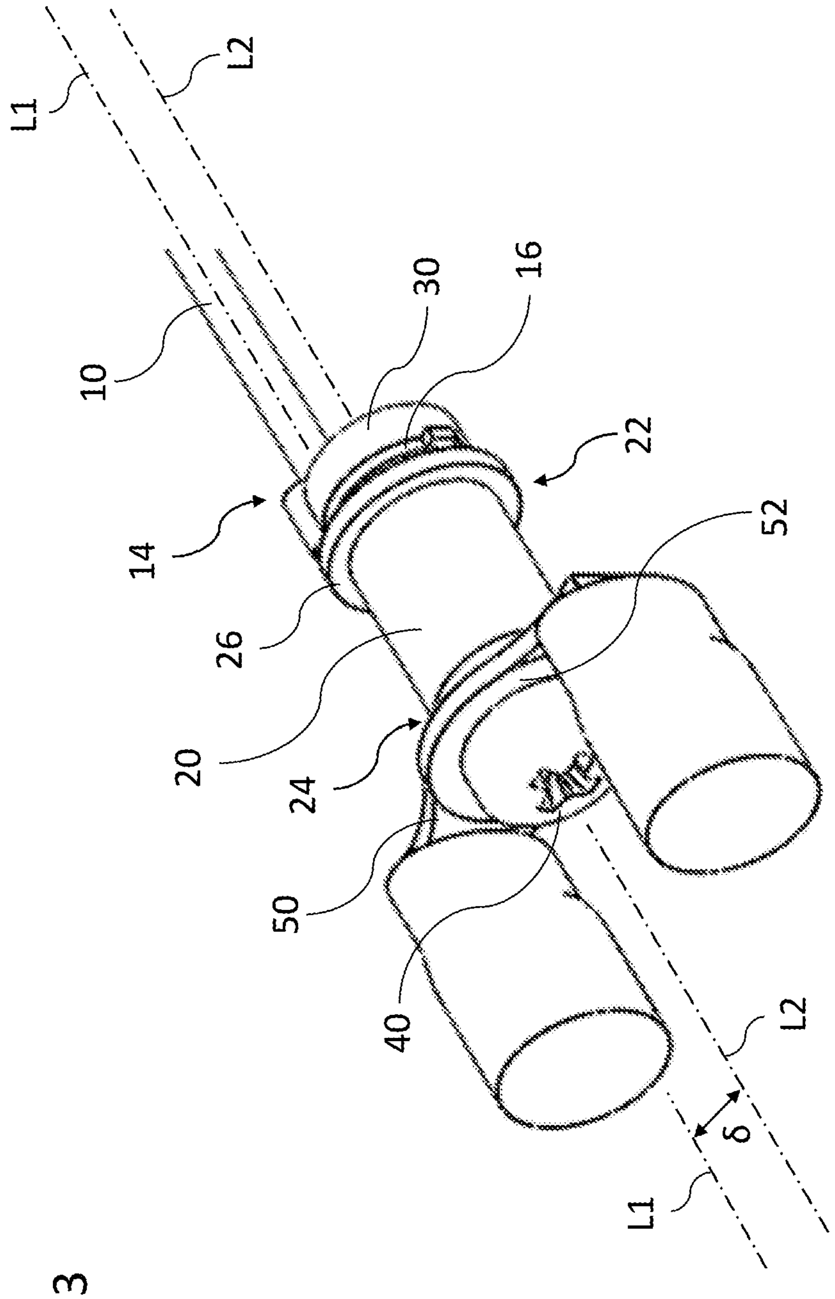
FIG. 3 shows a detail of FIG. 2.

The insert 20 has a first end 22 and a second end 24, opposite to the first end 22. The first end 22 of the insert 20 is electrically connected to the second end 14 of the flexible connector 10. The insert 20 may have a second main axis L2 as illustrated in FIG. 3 which shows a detail of FIG. 2. The second main axis L2 is preferably oriented parallel to the first main axis L1. Preferably, the first end 7 of the socket member 6 points in the same direction, e. g. in the first direction d1, as the first end 22 of the insert 20.

The second end 24 of the insert 20 is configured as an electrical connectivity receptacle, preferably as a screw type terminal, comprising a thread for receiving a screw 40.

The screw type terminal may be configured to provide an electrical connection to a cable 54, as exemplarily illustrated in FIG. 5, having a cross-section of up to 6 $mm^2$. Preferably, the screw type terminal is configured to accommodate at least one, for example—as illustrated in FIGS. 2 and 3—two external lugs 50, 52. Specifically, the screw type terminal may be configured to receive a cable having a ring terminal 55, as illustrated in FIG. 1, and/or a cable having a fork terminal. The relay base 2 may further comprise the screw 40. This facilitates handling of the relay base 2 when establishing an electrical connection to an external wiring.

In FIG. 3 illustrates a distance δ between the first main axis L1 and the second main axis L2. This distance δ preferably is less than five times an inner diameter of the thread of the second end 24 of the insert 20, preferably less than three times the inner diameter of the thread of the second end 24 of the insert 20. Alternatively, the distance may be less than 8 mm, preferably less than 5 mm.

The insert 20 may have a through-hole extending between the first end 22 and the second end 24 of the insert 20, wherein the thread of the second end 24 of the insert 20 is formed within the through-hole. The through-hole advantageously may have a main axis that coincides with the second main axis L2. The insert 20 may have a hollow cylindrical shape.

The relay base 2 preferably further comprises a lug member 16 for connecting the second end 14 of the flexible connector 10 to the first end 22 of the insert 20. The lug member 16 may be fixed to the second end 14 of the flexible connector 10, for example by a crimped connection. The first end 22 of the insert 20 may be configured as a further screw type terminal, comprising a further thread for receiving a further screw 30 for connecting the lug member 16 to the first end 22 of the insert 20. The lug member 16 may comprise a ring having a hole for receiving the further screw 30, wherein the ring extends in a ring plane oriented at least substantially perpendicular to the second main axis L2.

The further thread may be formed in the through-hole of the insert 20. This allows for a particularly compact design of the insert 20.

Figure 4:
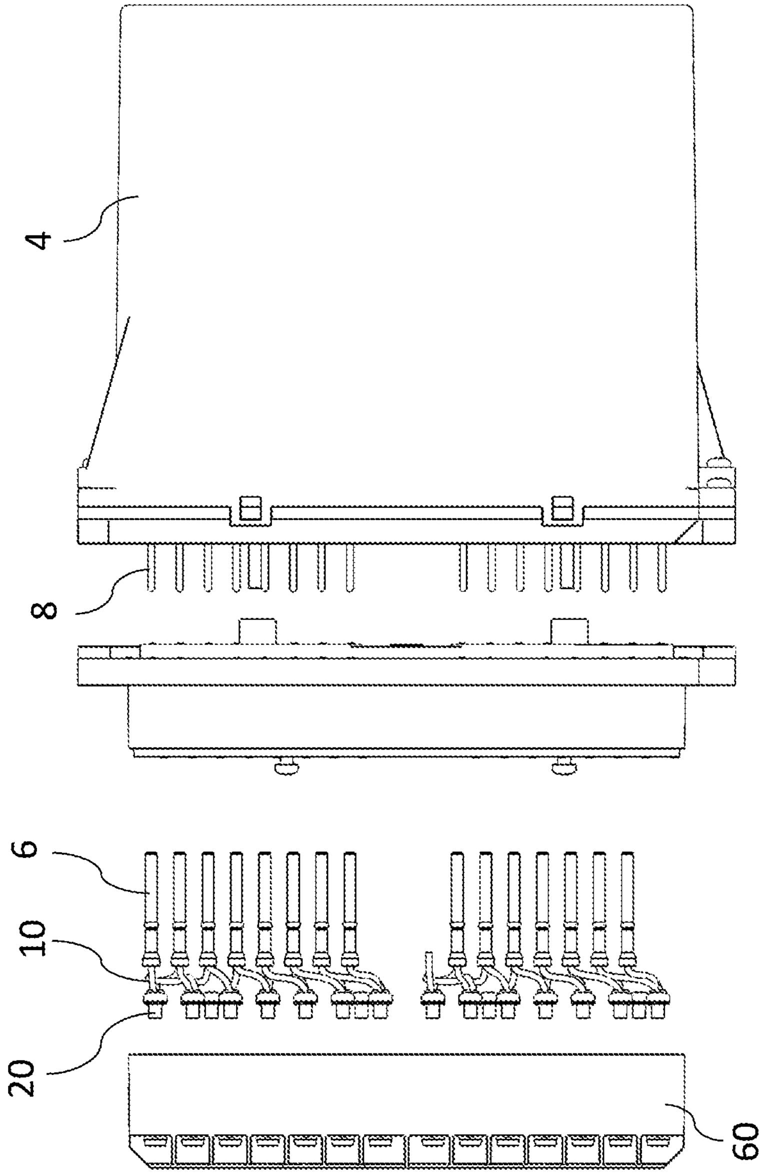
FIG. 4 is a schematic exploded view of the relay base.

FIG. 4 is a schematic exploded view of the relay base 2 and the plug-in relay 4. The relay base 2 may comprise a terminal plate 60. The terminal plate 60 may be made of an electrically insulating material, for example of a plastic material. The terminal plate 60 is preferably configured to support the insert 20. The insert 20 may be fixed to the terminal plate 60, for example by insert-molding the terminal plate 60 around the insert 20.

For example, the insert 20 may have a cylindrical surface portion, preferably extending around the second main axis L2, which is directly contacted and hold by the surrounding material of the terminal plate 60.

Further, the first end 22 of the insert 20 may comprise a flange 26. The flange 26 may be configured for fixing the insert 20 and/or for preventing a movement of the insert 20 in a direction parallel to the second main axis L2, particularly for preventing a movement of the insert 20 relative to the terminal plate 60 in the second direction d2. The flange 26 may be at least partially not mechanically contacted by the terminal plate 60. In this way the flange 26 allows preventing the corresponding movement of the insert 20 relative to the terminal plate 60 in the second direction d2 particularly reliably.

Part of the cylindrical surface portion of the insert 20 may be a structured surface portion, for example a knurled surface portion. This allows particularly reliable fixation of the insert 20 relative to the terminal plate 60.

The terminal plate 60 may extend predominantly in a first plane E1 perpendicular to the first main axis L1. More specifically, the terminal plate 60 may comprise a terminal plate base portion 61 extending in the first plane E1, wherein the inserts 20 are fixedly hold by the terminal plate base portion 61.

In the illustrated example, the inserts 20 of the connection units 3 are fixed to the terminal plate 60, more specifically to its terminal plate base portion 61 such that they are isolated from each other by the terminal plate base portion 61. Preferably, the terminal plate 60 comprises walls 70 for electrically isolating the inserts 20 from each other at a first side of the terminal plate base portion 61 facing the socket members 6. The walls 70 may extend from the terminal plate base portion 61 into the first direction d1.

Moreover, the terminal plate 60 may comprise further walls 72 for isolating the inserts 20 from each other at a second side opposite to the first side, i. e. at a side of the terminal plate base portion 61 which faces away from the socket members 6. The further walls may extend from the terminal plate base portion 61 into the second direction d2.

Further, the terminal plate 60 may comprise a surrounding wall 74 which surrounds the first ends 22 of the inserts 20 of the plurality of connection units 3, preferably in a closed ring-shaped manner at the first side of the terminal plate base portion 61. The surrounding wall 74 may protrude from the terminal plate base portion 61 into the first direction d1. The surrounding wall 74 may constitute a portion of a housing of the relay base 2.

The relay base 2 may further comprise a middle plate 62 for supporting the socket members 6 of the plurality of connection units 3. The middle plate 62 may be made of an electrically insulating material, for example of a plastic material. Specifically, the middle plate 62 may be configured to prevent a movement of the socket member 6 parallel to the first main axis L1, directing towards the insert 20, i. e. configured to prevent a movement of the socket member 6 relative to the middle plate 62 in the second direction d2. This is advantageous since in this manner it can be prevented that the socket member 6 is translated away from the pin 8 during plugging the relay 4 into the relay base 2.

The middle plate 62 may comprise a middle plate base portion 63 extending in a second plane E2 parallel to the first plane E1, wherein the socket members 6 are supported by the middle plate base portion 63. The middle plate base portion 63 may comprise a through-hole configured to support the socket member 6. The through-hole may be configured to support the socket member 6, however, to allow rotation of the socket member 6 around the first main axis L1.

The middle plate 62 may further comprise at least one spring arm 65 configured to prevent a movement of the socket member 6 relative to the middle plate base portion 63 in the second direction d2. The socket member 6 may comprise a flange 5 configured to interact with the middle plate 62, preferably with the spring arm 65 in order to prevent translation of the socket member 6 in the second direction d2.

The middle plate 62 may be configured to isolate the socket members 6 of the plurality of connection units 3 from each other. To this end the middle plate 62 may comprise walls 77 protruding from the middle plate base portion 63 in the first direction d1.

The middle plate 62 may further comprise a surrounding wall 75 which surrounds the socket members 6 of the plurality of connection units 3, preferably in a closed ring-shaped manner at a first side of the middle plate base portion 61 facing away from the terminal plate 60. The surrounding wall 75 may protrude from the middle plate base portion 63 into the first direction d1. The surrounding wall 75 of the middle plate 62 may constitute a further portion of the housing of the relay base 2.

The relay base 2 may further comprise a top plate 64 configured to prevent a movement of the socket member 6 parallel to the first main axis L1, directing to the side of the pin 8, i. e. configured to prevent a movement of the socket member 6 to the first direction d1. This is advantageous since in this manner it can be prevented that the socket member 6 is translated towards the relay 4 while disconnecting the relay base 2 from the relay 4.

The top plate 64 may comprise a top plate base portion 69 extending in a third plane E3 parallel to the first plane E1. The top plate base portion 69 may comprise a through-hole configured to guide the pin 8 of the relay 4 during connecting the relay 4 with the relay base 2 by a relative movement of the relay base 2 towards the relay 4, i. e. in the first direction d1. The through-hole of the top plate 64 may be configured to allow rotation of the socket member 6 around the first main axis L1.

The middle plate 62 and the top plate 63 may be configured to prevent a translation of the socket member 6 in the first direction d1 and in the second direction d2.

The support of the socket member 6 which allows rotation around the first main axis L2 is advantageous for assembling the relay base 2. Specifically, assembling the relay base 2 may comprise the following steps: (a) connecting the socket member 6, the flexible connector 10 and the lug member 16, (b) fixing the insert 20 to the terminal plate 62, (c) connecting the lug member 16 to the insert 20, and (d) connecting the socket member 6 with the middle plate 62 by pushing the socket member 6 into the through hole of the middle plate 62. Preferably, the steps (a) to (d) are carried out in the order (a), (b), (c), (d). The rotational support of the socket member 6 allows for preventing unwanted torsional forces from acting on the flexible connector 10.

The top plate 64 may be fixed to the middle plate 62, for example by an ultrasonic welding connection. This allows for a suitable and reliable connection.

The terminal plate 60 may be connected to the middle plate 64 by a screw coupling.

The terminal plate 60, the middle plate 62 and the top plate 64 may be attached to each other to form a housing for the plurality of connection units 3.

The housing of the relay base 2 may be specifically composed or formed by the terminal plate base portion 61, the surrounding wall 74 of the terminal plate 60, the surrounding wall 75 of the middle plate 62 and the top plate base portion 69.

The relay base 2 may be configured such that each one of the socket members of the plurality of connection units 3 is electrically coupled to one of the inserts of the plurality of connection units in such a way that no two of the socket members are connected to one of the inserts. Correspondingly, no two of the inserts are preferably connected to one of the socket members. In this way each one of the pins 8 of the relay 4 will be connected by the relay base 2 to one of the screw type terminals of the inserts 20. This allows avoiding mismatch or shorting between the connections.

Figure 7:
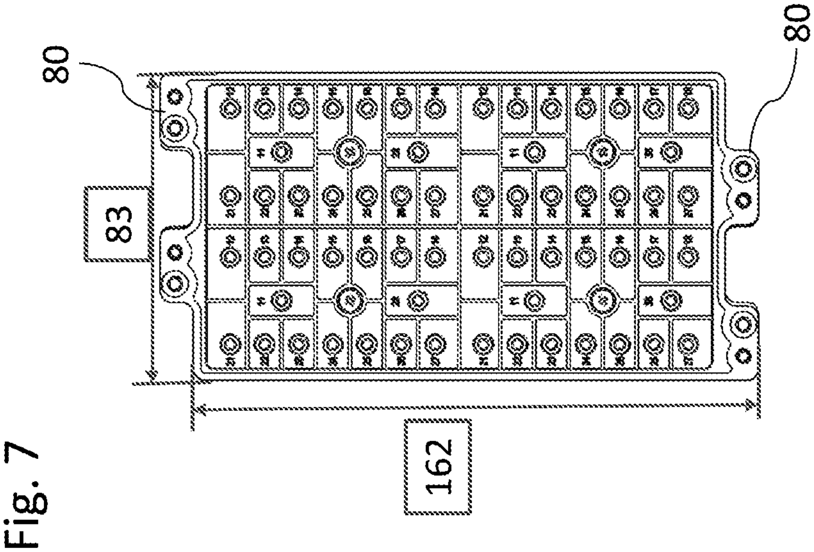
FIG. 7 is a normal view of the screw type terminals of the relay base.

For example, the plurality of connection units 3 may comprise between fifty-four and seventy-four, preferably between sixty and sixty-eight connection units. FIG. 7 illustrates a normal view of the second side of the terminal plate 60 in case of a relay base 2 providing sixty-four connection units, i. e. sixty-four screw type terminals.

The relay base 2 may have a first dimension which is between 73 mm and 93 mm and a second dimension which is between 152 mm and 172 mm and/or a third dimension which is between 40 mm and 65 mm, preferably between 50 mm and 60 mm, more preferably between 53 and 55 mm. FIG. 7 illustrates a relay base 2 having a first dimension of 83 mm and a second dimension of 162 mm.

Figure 8:
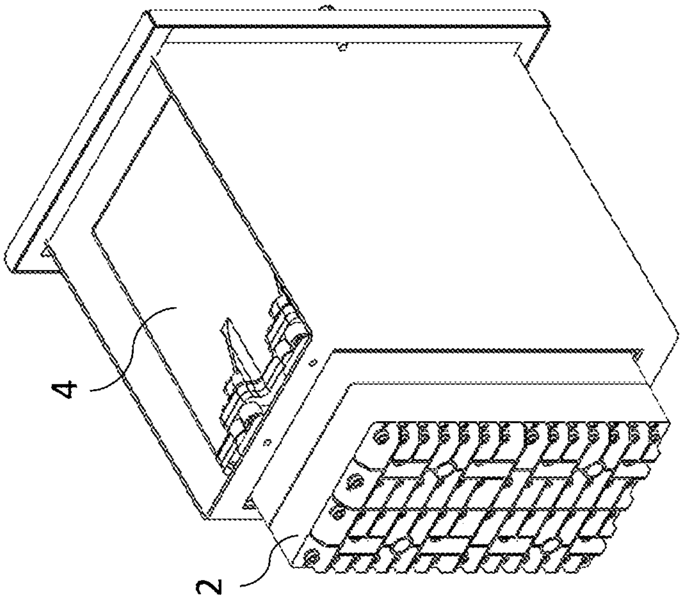
FIG. 8 is a perspective view of the relay base connected to a plug-in relay, wherein the relay base is mounted on a case system for panel mounting.

The relay base 2 may be configured to be mounted on a support, for example on a panel board for flush mounting as exemplarily illustrated in FIG. 8 or to a rack 90, as exemplarily illustrated in FIG. 10.

To this end, the relay base 2 may comprise means for mounting the relay base 2 to a support such as the rack 90, wherein the means for mounting the relay base 2 may comprise for example a flange 80 as illustrated e. g. in FIGS. 1 and 10. For example, the flange 80 may be formed as a portion of the top plate 64, wherein the flange 80 protrudes from the remainder of the top plate 64 in a direction perpendicular to the first main axis L1. Preferably, at least two flanges 80 are provided directing in opposite directions. The flanges 80 may also be configured as means for mechanically connecting the relay base 2 to the relay 4.

FIG. 9*a* illustrates an example of a relay base connected to four relays, FIG. 9*b* the relay base connected to two relays and FIG. 9*c* the relay base connected to one relay. As illustrated, the relay base may be configured to be connected to relays of different sizes. Thus, a kit may be provided which comprises at least one relay base and at least one plug-in relay configured to be connected to the at least one relay base.

While the present disclosure has been described in detail in the drawings and forgoing description, such description is to be considered illustrative or exemplary and not restrictive. Variations to the disclosed embodiments can be understood and effected by those skilled in the art and practicing the claimed subject-matter, from a study of the drawings, the disclosure, and the appended claims. In the claims, the word "comprising" does not exclude other elements, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A relay base for connection to a plug-in relay, comprising a plurality of connection units, each connection unit comprising:

an electrically conductive socket member having a first end and a second end, the first end being configured to receive a pin of the relay;

an electrically conductive flexible connector having a first end and a second end, the first end of the flexible connector being electrically connected to the second end of the socket member; and an electrically conductive insert having a first end and a second end, the first end of the insert being electrically connected to the second end of the flexible connector, wherein the second end of the insert is configured as an electrical connectivity receptacle.

2. The relay base of claim 1, wherein the electrical connectivity receptacle comprises a screw type terminal, comprising a thread for receiving a screw.

3. The relay base of claim 2, wherein the insert has a through-hole extending between the first end and the second end of the insert, wherein the thread of the second end of the insert is formed within the through-hole.

4. The relay base of claim 2, wherein the first end of the insert is configured as a further screw type terminal, comprising a thread for receiving a further screw for connecting the lug member.

5. The relay base of claim 1, further comprising a lug member for connecting the second end of the flexible connector to the first end of the insert.

6. The relay base of claim 5, wherein the second end of the flexible connector is connected to the lug member by a crimped connection.

7. The relay base of claim 1, wherein the socket member has a first main axis and the thread of the second end of the insert has a second main axis being parallel to the first main axis.

8. The relay base of claim 7, further comprising a top plate configured to prevent a movement of the socket member parallel to the first main axis, directing to the side of the pin.

9. The relay base of claim 8, further comprising a middle plate for supporting the socket member.

10. The relay base of claim 9, wherein the top plate is fixed to the middle plate by an ultrasonic welding connection.

11. The relay base of claim 9, wherein the middle plate and the top plate are configured to allow a rotation of the socket member about the first main axis.

12. The relay base of claim 9, further comprising a terminal plate for supporting the insert.

13. The relay base of claim 12, wherein the terminal plate, the middle plate, and the top plate are attached to each other to form a housing for the plurality of connection units.

14. The relay base of claim 7, wherein the first end of the insert comprises a flange.

15. The relay base of claim 14, wherein the flange is configured for fixing the insert in a direction parallel to the second main axis.

16. The relay base of claim 14, wherein the flange is configured for preventing a movement of the insert in a direction parallel to the second main axis.

17. The relay base of claim 1, wherein the first end of the flexible connector is connected to the second end of the socket member by a crimped connection.

18. The relay base of claim 1, further comprising a terminal plate for supporting the insert.

19. The relay base of claim 18, wherein the insert is fixed to the terminal plate by insert-molding the terminal plate around the insert.

20. A relay kit, comprising at least one relay base according to claim 1, and at least one plug-in relay configured to be connected to the at least one relay base.

* * * * *